UNITED STATES PATENT OFFICE

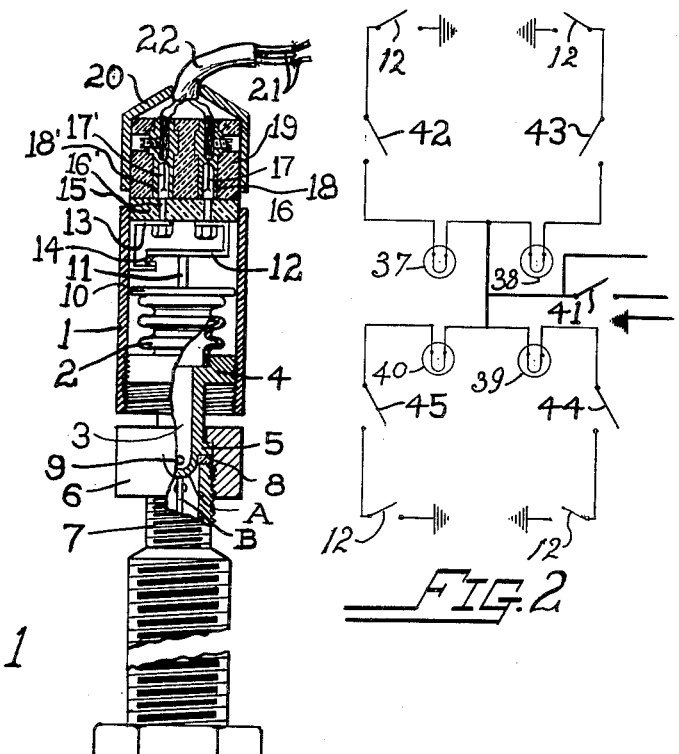
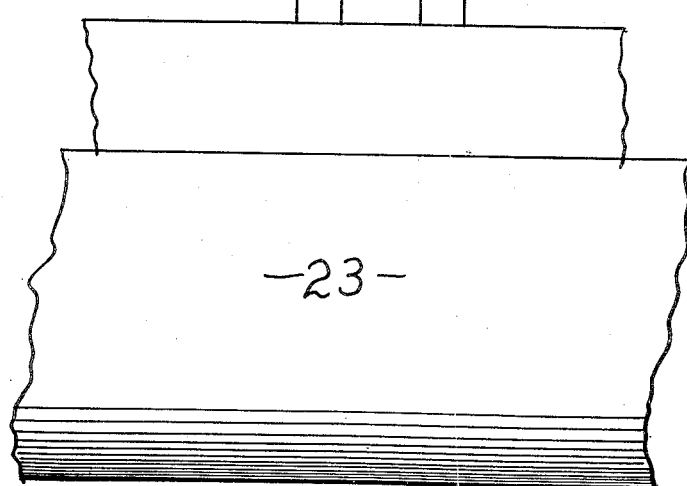

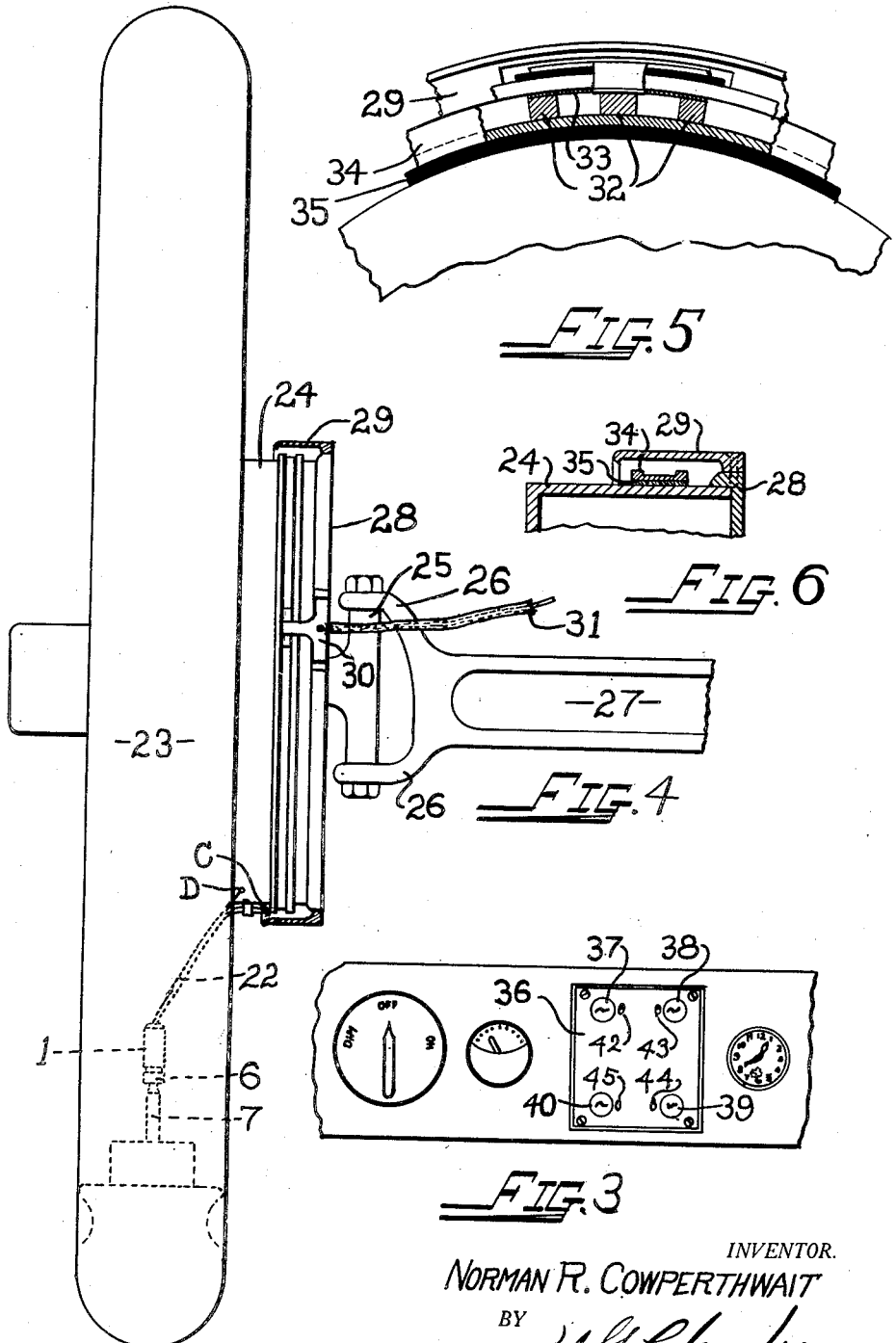

NORMAN R. COWPERTHWAIT, OF SILVER LAKE, KANSAS

ELECTRIC ANNUNCIATOR FOR AUTOMOBILE TIRES

Application filed May 18, 1928. Serial No. 278,868.

My invention relates to an electric annunciator for automobile tires.

The object of my invention is to provide an annunciator having a panel that will indicate the pressure in the tires separately when the pressure becomes dangerously low, the panel being visible to the operator or passengers within the automobile.

A further object of my invention is to provide an automobile tire deflation indicator to be placed on the instrument board in plain view of the operator, the indicator being so arranged to indicate which of the tires have become deflated wholly or in part.

A still further object of my invention is to provide a separate switch for each of the tires, at the same time the system of wiring being controlled by the ignition switch.

A still further object of my invention is to provide a pressure actuated switch for the tire, attachably arranged on the outer end of the tube valve stem; and, furthermore, to provide a plug connection at the outer end of the switch housing.

A still further object of my invention is to provide an indicator in which the principle of making and breaking the current in the tire may be elaborated, whereby the pressure in the tire may be recorded in variations of approximately five pounds; other variations, however, may be arranged.

A still further object of my invention is to provide an annunciator that is discernible visually, and a mechanism that is simple to install and does not alter the present standard construction of valve and stem therefor, and the annunciating panel can be easily placed on an instrument board of a standard make.

These and other objects will hereinafter be more fully explained, reference being had to the accompanying drawings forming a part of this specification, wherein like characters will apply to like parts throughout the different views.

Referring to the drawings briefly:

Fig. 1 is an enlarged sectional view of the switch mechanism and its connecting means to the valve stem of a tire tube.

Fig. 2 is a wiring diagram.

Fig. 3 shows a fragmentary portion of an instrument board, having the annunciating panel placed thereon.

Fig. 4 is an elevation of the front wheel and fragmentary portion of the front axle of a car.

Fig. 5 is an enlarged detailed side elevation of the brake drum contact, partly in section for convenience of illustration.

Fig. 6 is an enlarged cross section through the rim of the brake drum.

The mechanism herein disclosed consists of a housing 1 in which is positioned a flexibly arranged bellows 2, the said bellows being rigidly attached to a tube member 3 as a penumatic means. The said tube has a flange 4 threadedly engaging in the lower end of housing 1 as adjusting means for the throw of the switch. The opposite end of the tube has a flange 5 to engage in a union 6, substantially as shown. The said union threadedly engages with the outer end of a standard make of air valve stems for tire tubes, by which means the said housing is firmly connected to the outer end of said stem and made air-tight thereto by a gasket 8 as sealing means between the tube 3 and the end of the valve stem.

The outer end of tube 3 is pointedly arranged as at A to contact on the valve core stem B, opening the valve, by which arrangement the air pressure within the tire tube is free to exhaust into the bellows through the medium of the tube 3, the air passing through a plurality of apertures positioned in the point of the tube, as shown at 9.

Attached to the outer end of the bellows is a disc member 10 made of insulating material, and having a pin 11 centrally positioned and outwardly extending to contact with a resiliently arranged switch member 12, the last said member functioning as a contact to make and break an electric current, this being accomplished by the expansion and contraction of the bellows, as governed by the pressure in the tire tube.

Positioned in the housing in working relation to member 12 is a member 13, last said member being the other side of the switch, and each of said members having a contact point in registry with each other, as shown at 14. The said members 12 and 13 are attached to an insulation block 15 by means of binding posts 16 and 16'. The outer or upper ends of the posts are arranged as plugs 17 and 17', fitting snugly within sockets 18 and 18' respectively. The said sockets, with their respective wire connections, are carried by an insulation block 19 that is housed in a cap member 20. It is now readily seen how the cap and its respective parts are removably arranged, functioning as a plug. Extending from the plug are wires 21, said wires having an insulation 22 securely inclosing the same.

It will be understood that the above disclosure pertaining to the switch mechanism applies to a switch of similar arrangement for each wheel of the automobile, and the description will apply to each thereof.

In Figs. 4 and 5 is shown the method of transmitting the current while the wheels rotate, the method being applicable to brake drums such as commonly used for the four-wheel brake system. Fig. 4 illustrates the application to one of the front wheels of an automobile, in which is shown a wheel 23, a drum member 24 carried by the wheel, and a knuckle 25 pivotally engaging with the forks 26 of an axle 27. The knuckle rigidly carries a head 28, to which is attached certain members of the brake, none of which are shown, as these elements are not involved in applicant's invention; however, the head is a supporting member for an annular guard 29 firmly attached to the head and insulated therefrom, a bracket 30, to which the feed wires 31 connect. On the outer end of the bracket is attached a brush member 32, said member being shown in three parts, and being connected with a resilient member 33. This arrangement, however, is not compulsory, as a single block or brush member may be employed.

Peripherally arranged on the exterior of drum 24 is a channeled metal track 34, in which the brush members will engage as the wheel rotates. The said track is separated from the drum by an insulation 35. By this arrangement the electric current is transmitted to a switch arrangement through the medium of cable 21, heretofore described, the outer end of the cable having one wire connected to the channeled member, as shown at C in Fig. 4, the other wire grounded on the drum as at D.

Positioned on the instrument board is an annunciator panel 36, having positioned thereon four electric lamps 37, 38, 39, and 40. The said lamps function separately for each of the four wheels; that is to say, when the switch is closed by deflation of any of the tires, the lamp corresponding to the tire will be illuminated. For instance, should the front left-hand tire become deflated, lamp 37 will immediately become illuminated; and likewise, for the right-hand front tire and its corresponding lamp 38; and the deflation of the right-hand rear tire will be announced by lamp 39, and the left-hand rear tire by lamp 40.

The connection of the different lamps to their respective wheels is clearly shown in the wiring diagram in Fig. 2, and also the connection to the battery of the automobile. It will be understood that the ignition switch 41 will make and break the current between the battery and the wiring system between the tires and the annunciator. There is also arranged a switch for each separate lamp, as indicated at 42, 43, 44, and 45, the said switches being arranged in close proximity to their respective lamps, as shown in the drawings, or may be placed otherwise at the discretion of the manufacturer.

Such modifications may be employed as lie within the scope of the appended claims.

Having fully described my invention, what I claim as new and desire to secure by Letters Patent is:

1. In a mechanism of the kind described, the combination of a housing containing a bellows, a tube, and a switch, the housing being in threaded engagement with the tube, and the said tube being in threaded engagement with a valve stem, the threaded engagement between the housing and the tube providing a means of adjustment for the switch.

2. In a mechanism of the kind described, a cylindrical housing, a bellows, and a switch, the bellows and switch positioned within the housing, a tube having a flanged portion at one end engaging with the housing and having a plurality of apertures in the other end, the interior of the tube connected to the interior of the bellows, means to affix the apertured end of the tube in a valve stem, the tube depressing a valve mechanism in the stem to admit air pressure to the bellows.

In testimony whereof I affix my signature.

NORMAN R. COWPERTHWAIT.